United States Patent
Liu et al.

(10) Patent No.: US 11,653,293 B2
(45) Date of Patent: May 16, 2023

(54) ACCESS METHOD AND DEVICE

(71) Applicant: CHINA ACADEMY OF TELECOMMUNICATIONS TECHNOLOGY, Beijing (CN)

(72) Inventors: Jiamin Liu, Beijing (CN); Dajun Zhang, Beijing (CN); Ying Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 15 days.

(21) Appl. No.: 17/044,217

(22) PCT Filed: Feb. 15, 2019

(86) PCT No.: PCT/CN2019/075191
§ 371 (c)(1),
(2) Date: Sep. 30, 2020

(87) PCT Pub. No.: WO2019/192269
PCT Pub. Date: Oct. 10, 2019

(65) Prior Publication Data
US 2021/0029624 A1    Jan. 28, 2021

(30) Foreign Application Priority Data
Apr. 4, 2018    (CN) .......................... 201810302002.4

(51) Int. Cl.
*H04W 48/16*    (2009.01)
*H04W 8/08*    (2009.01)
(Continued)

(52) U.S. Cl.
CPC ............. *H04W 48/16* (2013.01); *H04W 8/08* (2013.01); *H04W 48/20* (2013.01);
(Continued)

(58) Field of Classification Search
CPC ....... H04W 48/16; H04W 8/08; H04W 48/20; H04W 74/0833; H04W 76/11;
(Continued)

(56) References Cited

U.S. PATENT DOCUMENTS

| 9,179,444 B2 | 11/2015 | Van Phan et al. | |
| 2010/0322148 A1* | 12/2010 | Liu | H04W 84/047 370/315 |

(Continued)

FOREIGN PATENT DOCUMENTS

| CN | 102217352 A | 10/2011 |
| CN | 102892150 A | 1/2013 |

(Continued)

OTHER PUBLICATIONS

First Office Action and search report from CN app. No. 201810302002.4, dated Feb. 28, 2020, with English translation from Global Dossier.

(Continued)

*Primary Examiner* — Inder P Mehra
(74) *Attorney, Agent, or Firm* — Ladas & Parry, LLP

(57) ABSTRACT

An access method and a device are provided. The access method is applied to a first wireless backhaul node and includes: determining a previous hop node of the first wireless backhaul node, the previous hop node being a home donor base station of the first wireless backhaul node or being a second wireless backhaul node; and transmitting first information to the home donor base station directly or transmitting the first information to the home donor base station via the second wireless backhaul node.

13 Claims, 8 Drawing Sheets

---

71 receiving, by the home donor base station, first information transmitted by the first wireless backhaul node, wherein the first information includes identity information of the first wireless backhaul node and/or operating mode information of the first wireless backhaul node

(51) Int. Cl.

| | | |
|---|---|---|
| *H04W 48/20* | (2009.01) | |
| *H04W 74/08* | (2009.01) | |
| *H04W 76/11* | (2018.01) | |
| *H04W 76/27* | (2018.01) | |
| *H04W 88/14* | (2009.01) | |
| *H04W 88/08* | (2009.01) | |
| *H04W 92/20* | (2009.01) | |
| *H04W 48/08* | (2009.01) | |
| *H04W 48/00* | (2009.01) | |
| *H04W 84/04* | (2009.01) | |
| *H04W 92/24* | (2009.01) | |
| *H04B 7/155* | (2006.01) | |

(52) U.S. Cl.
CPC ........ *H04W 74/0833* (2013.01); *H04W 76/11* (2018.02); *H04W 76/27* (2018.02); *H04W 88/14* (2013.01)

(58) Field of Classification Search
CPC ... H04W 76/27; H04W 88/14; H04W 88/085; H04W 92/20; H04W 48/08; H04W 48/17; H04W 84/047; H04W 92/24; H04B 7/15557
USPC .................................................. 370/329, 370
See application file for complete search history.

(56) References Cited

U.S. PATENT DOCUMENTS

| | | | | |
|---|---|---|---|---|
| 2011/0222428 | A1 | 9/2011 | Charbit et al. | |
| 2012/0294225 | A1 | 11/2012 | Awad et al. | |
| 2013/0172000 | A1 | 7/2013 | Van Phan et al. | |
| 2013/0279364 | A1* | 10/2013 | Nagata .................. | H04B 7/155 370/252 |
| 2016/0191173 | A1 | 6/2016 | Malaney | |
| 2018/0014213 | A1* | 1/2018 | Bennett ................ | H04W 24/04 |
| 2018/0092139 | A1 | 3/2018 | Novlan et al. | |
| 2018/0124677 | A1* | 5/2018 | He ........................ | H04W 40/24 |
| 2019/0215055 | A1* | 7/2019 | Majmundar .......... | H04W 40/04 |

FOREIGN PATENT DOCUMENTS

| | | |
|---|---|---|
| CN | 103069860 | 4/2013 |
| CN | 105282760 A | 1/2016 |
| CN | 105680926 A | 6/2016 |
| CN | 106034343 A | 10/2016 |
| EP | 2560452 A1 | 2/2013 |
| WO | 2010057521 A1 | 5/2010 |

OTHER PUBLICATIONS

International Search Report from PCT/CN2019/075191, dated May 15, 2019, with English translation from WIPO.
Written Opinion of the International Searching Authority from PCT/CN2019/075191, dated May 15, 2019, with English translation from WIPO.
International Preliminary Report on Patentability from PCT/CN2019/075191, dated Oct. 6, 2020, with English translation from WIPO.
"Some Issues Concerning RN startup", R2-102008, 3GPP TSG RAN WG2 #69bis, Beijing, China, Apr. 12-16, 2010.
"Architecture for integrated access and backhaul", R2-1801022, 3GPP TSG-RAN WG2 NR AH1801, Vancouver, Canada, Jan. 22-26, 2018.
"Overall high layer design of IAB", R2-1081131, 3GPP TSG-RAN WG2 Ad Hoc, Vancouver, Canada, Jan. 22-26, 2017.
"IAB Network Architecture and protocol stack", R3-180831, 3GPP TSG-RAN WG3-AH-1801, Athens, Greece, Feb. 26-Mar. 2, 2018.
"IAB Discovery and Route Selection", R3-181361, 3GPP TSG-RAN WG3#99, Athens, Greece, Feb. 26-Mar. 2, 2018.
"Destination Address and Forwarding Path based Routing for IAB", R3-180816, 3GPP TSG-RAN WG3 Meeting #99, Athens, Greece, Feb. 26-Mar. 2, 2018.
"Functional split between IAB node and other network nodes", R2-181311, 3GPP TSG-RAN WG3 Meeting #99, Athens, Greece, Feb. 26-Mar. 2, 2018.
"Setup procedures for IAB0node and UE connected to an IAB node", R3-181313, 3GPP TSG-RAN WG3 Meeting #99, Athens, Greece, Feb. 26-Mar. 2, 2018.
"On RAN architecture for IAB relaying in NR", R3-181351, 3GPP TSG-RAN WG3 Meeting #99, Athens, Greece, Feb. 26-Mar. 2, 2018.
Extended European Search Report from EP app. No. 19781813.1, dated May 6, 2021.

* cited by examiner receiving, by the home donor base station, first information transmitted by the first wireless backhaul node, wherein the first information includes identity information of the first wireless backhaul node and/or operating mode information of the first wireless backhaul node ⟵ 71

ACCESS METHOD AND DEVICE

CROSS-REFERENCE TO RELATED APPLICATIONS

The present application is a U.S. national phase application of a PCT Application No. PCT/CN2019/075191 filed on Feb. 15, 2019, which claims a priority to the Chinese patent application No. 201810302002.4 filed in China on Apr. 4, 2018, the disclosures of which are incorporated in their entireties by reference herein.

TECHNICAL FIELD

Embodiments of the present disclosure relate to the field of communication technology, in particular to an access method and a device.

BACKGROUND

In future development of mobile communication systems, the network capacity and throughput will be significantly increased to meet user demands better. Inevitably, more transmission nodes and greater transmission bandwidth will be introduced. In a fifth-generation (5G) network, the quantity of access nodes will be significantly increased. However, it cannot be ensured that all the access nodes meet conditions for wired backhaul, so the adoption of wireless access nodes will be inevitable. In the face of higher demands for transmission rate and transmission latency in 5G, higher requirements are imposed on the wireless backhaul network.

However, in the related art, no startup operation process has been specified for 5G wireless backhaul nodes. As 5G wireless backhaul nodes may have multiple characteristic options, and corresponding processing and subsequent process cannot be performed depending on the characteristics of the 5G wireless backhaul nodes according to the startup process in the related art, efficiency is decreased.

SUMMARY

It is an object of embodiments of the present disclosure to provide an access method for a wireless backhaul node and a device, so as to improve the access efficiency of accessing a network by the wireless backhaul node.

The present disclosure provides, in some embodiments, an access method, applied to a first wireless backhaul node, including: determining a previous hop node of the first wireless backhaul node, wherein the previous hop node is a home donor base station of the first wireless backhaul node or is a second wireless backhaul node; and transmitting first information to the home donor base station directly or transmitting the first information to the home donor base station via the second wireless backhaul node; wherein the first information includes identity information of the first wireless backhaul node and/or operating mode information of the first wireless backhaul node.

The present disclosure further provides, in some embodiments, another access method, applied to a home donor base station of a first wireless backhaul node, including: receiving, by the home donor base station, the first information transmitted by the first wireless backhaul node, wherein the first information includes identity information of the first wireless backhaul node and/or operating mode information of the first wireless backhaul node.

The present disclosure further provides, in some embodiments, a first wireless backhaul node, including a transceiver, a storage, a processor and a program stored in the storage and configured to be executed by the processor, wherein the processor is configured to read the program from the storage to implement following process: determining a previous hop node of the first wireless backhaul node, wherein the previous hop node is a home donor base station of the first wireless backhaul node or is a second wireless backhaul node; the transceiver is configured to transmit first information to the home donor base station directly or transmit the first information to the home donor base station via the second wireless backhaul node; wherein the first information includes identity information of the first wireless backhaul node and/or operating mode information of the first wireless backhaul node.

The present disclosure further provides, in some embodiments, another first wireless backhaul node, including: a determination unit, configured to determine a previous hop node of the first wireless backhaul node, wherein the previous hop node is a home donor base station of the first wireless backhaul node or is a second wireless backhaul node; and a transmission unit, configured to transmit first information to the home donor base station directly or transmit the first information to the home donor base station via the second wireless backhaul node, wherein the first information includes identity information of the first wireless backhaul node and/or operating mode information of the first wireless backhaul node.

The present disclosure further provides, in some embodiments, a donor base station. The donor base station is the home donor base station of the first wireless backhaul node, and includes a transceiver, a storage, a processor and a program stored in the storage and configured to be executed by the processor, wherein the transceiver is configured to receive the first information transmitted by the first wireless backhaul node, the first information includes identity information of the first wireless backhaul node and/or operating mode information of the first wireless backhaul node.

The present disclosure further provides, in some embodiments, another donor base station. The donor base station is the home donor base station of the first wireless backhaul node, and includes a reception unit configured to receive the first information transmitted by the first wireless backhaul node, wherein the first information includes identity information of the first wireless backhaul node and/or operating mode information of the first wireless backhaul node.

The present disclosure further provides, in some embodiments, a computer readable storage medium storing therein a computer program, the computer program is configured to be executed by a processor to implement the steps of foregoing access methods.

With the access method and the device provided by the embodiments of the present disclosure, the first wireless backhaul node transmits the identity information and/or operating mode information to the home donor base station, so that the home donor base station can select a suitable core network node for the first wireless backhaul node and perform processing of the subsequent access procedure based on the identity information and/or operating mode information during access process of the first wireless backhaul node. As such, the wireless backhaul node can accomplish the initialization procedure and configuration properly and provide users with support for continuous high-rate transmission, thereby improving the access efficiency of accessing a network by the wireless backhaul node.

BRIEF DESCRIPTION OF THE DRAWINGS

Various other advantages and benefits will become apparent to those of ordinary skill in the art upon reading the following detailed description of the preferred embodiments. The drawings are intended merely for the purpose of illustrating the preferred embodiments, and are not to be considered as limitations on the present disclosure. Furthermore, throughout the drawings, identical components are denoted by the same reference number. In the drawings.

DETAILED DESCRIPTION

The technical solutions in the embodiments of the present disclosure will be described clearly and thoroughly with reference to the drawings in the embodiments of the present disclosure. Obviously, the described embodiments are merely some of the embodiments of the present disclosure, and not all of them. Based on the embodiments in the present disclosure, all other embodiments obtained by those of ordinary skill in the art without creative effort shall fall within the scope of the present disclosure.

The term "include", "comprise" and any variations thereof in the specification and claims of this application are intended to cover non-exclusive inclusion. For example, a process, method, system, product or device including a series of steps or units is not necessarily limited to those steps or units explicitly listed, but may include other steps or units not explicitly listed or inherent to the process, method, product or device. In addition, terms "and/or" are used in the specification and claims to denote at least one of connected objects. For example, A and/or B means that there are three cases: only A exists, only B exists, and both A and B exist.

In the embodiments of the present disclosure, expressions such as "exemplary" or "for example" are used to represent that an associated feature is used as an example, illustration or explanation. Any embodiment or design among the embodiments of the present disclosure that is described as "exemplary" or "for example" should not be interpreted as being more preferable or advantageous than other embodiments or designs. Rather, expressions such as "exemplary" or "for example" are intended to present relevant concepts in a specific manner.

To enable better understanding of the technical solutions of embodiments of the present disclosure, the following technical points are introduced first.

(1) Introduction on the 5G Mobile Communication System.

Figure 1:
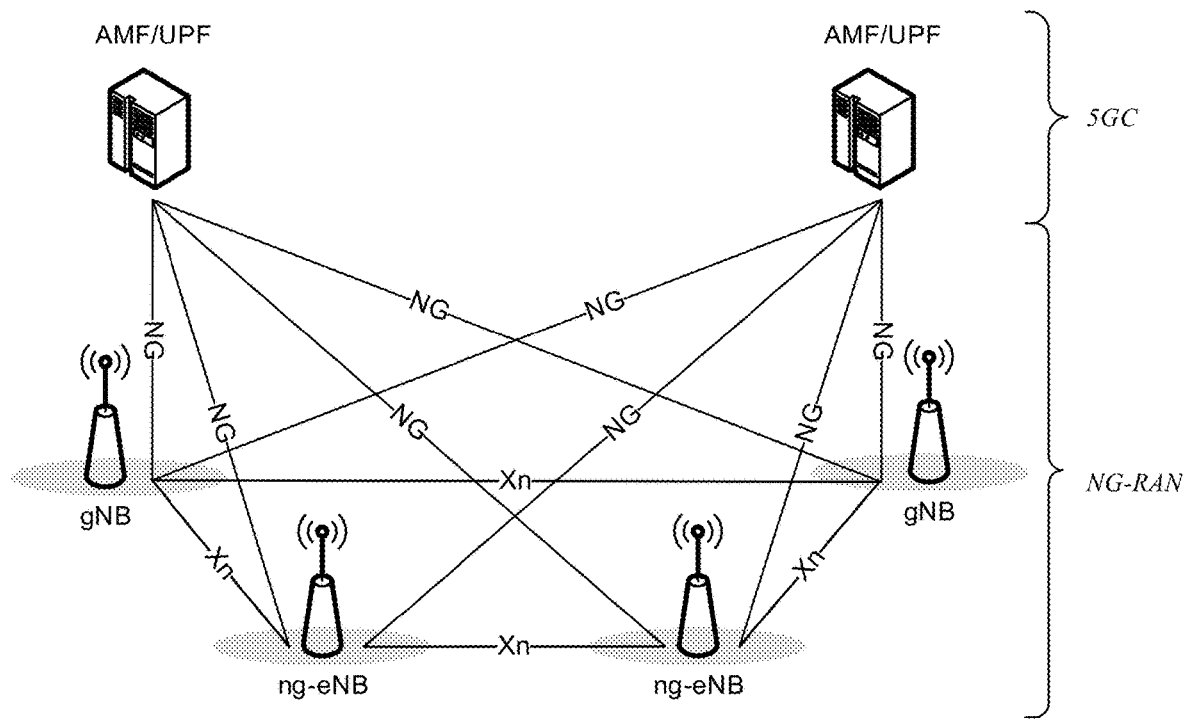
FIG. 1 is a schematic structural view of an architecture of a 5G mobile communication system in the related art.

In the 5G mobile communication system, the nodes on the network side are mostly connected via wired connections. The gNBs (NR NodeBs) are connected to each other via wired links. The gNB and the core network node, such as the access and mobility maintenance function (AMF) entity and the user plane function (UPF) entity, are also connected to each other via wired links, as shown in FIG. 1.

(2) Introduction on the 5G Wireless Protocol Architecture.

Figure 2:
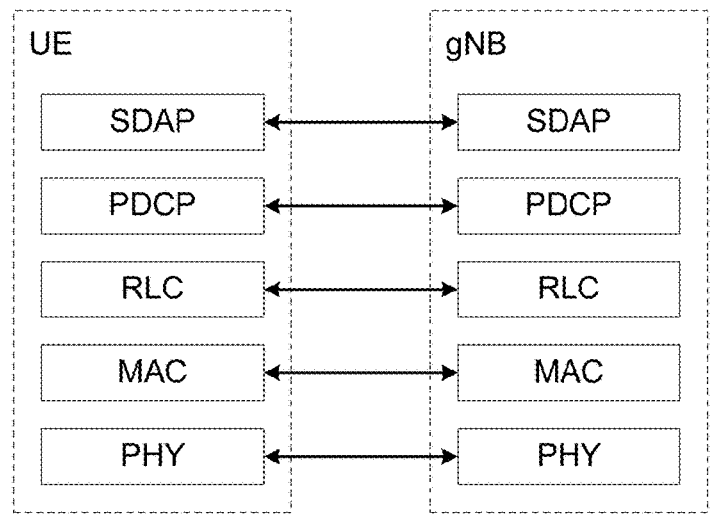
FIG. 2 is a schematic view of a user plane protocol stack architecture in a 5G mobile communication system in the related art.
Figure 3:
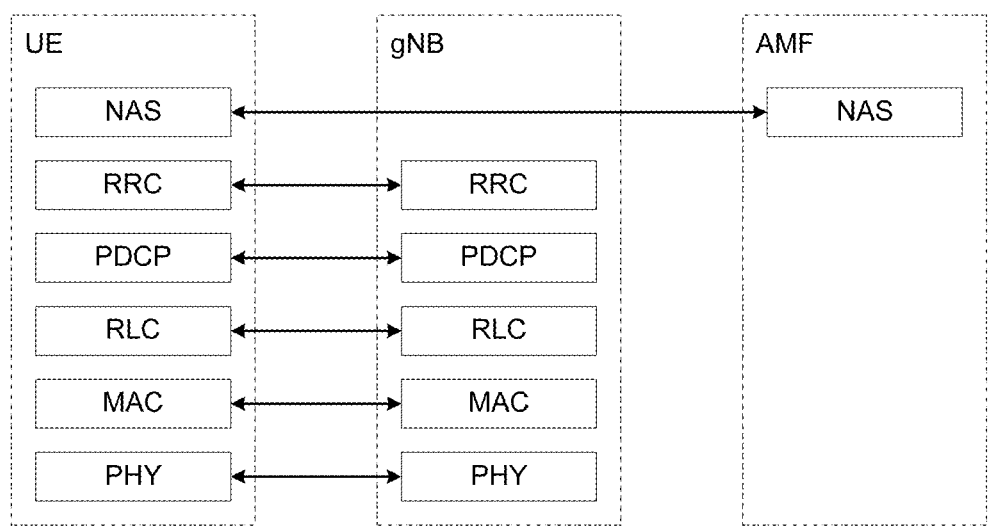
FIG. 3 is a schematic view of a control plane protocol stack architecture in a 5G mobile communication system in the related art.

The 5G basic user plane protocol hierarchy includes: service data adaptation protocol (SDAP), packet data convergence protocol (PDCP), radio link control (RLC), media access control (MAC) and physical layer (PHY). The control panel protocol hierarchy includes: non-access stratum (NAS), radio resource control (RRC), PDCP, RLC, MAC and PHY. The schematic views of the user plane protocol stack architecture and control plane protocol stack architecture are as shown in FIG. 2 and FIG. 3 respectively.

Embodiments of the present disclosure are described hereinafter with reference to the drawings. The access method and the device according to the embodiments of the present disclosure can be applied to a wireless communication system. This wireless communication system may be a 5G system or an evolved long term evolution (eLTE) system or a subsequent evolved communication system.

Figure 4:
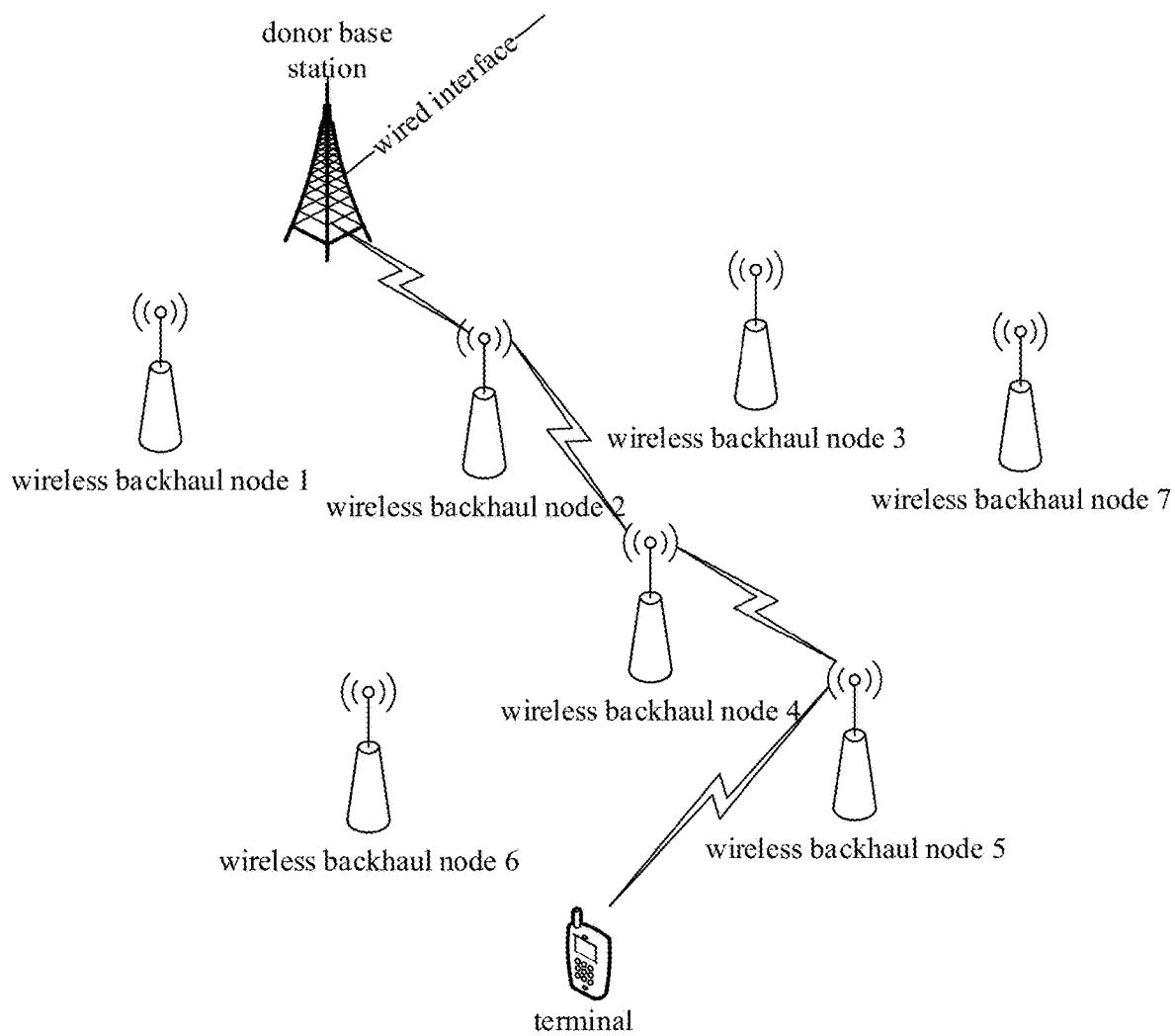
FIG. 4 is a schematic view of an application scenario of an access method according to an embodiment of the present disclosure.

FIG. 4 shows an application scenario of an access method according to an embodiment of the present disclosure. The wireless backhaul nodes 1 to 7 in FIG. 4 form a wireless backhaul network, in which a multi-hop backhaul path from a network side node such as the donor base station, sequentially through a wireless backhaul node 2, a wireless backhaul node 4 and a wireless backhaul node 5, to the terminal is established. Taking a 5G system as an example, the wireless backhaul nodes in FIG. 4 may be integrated access and backhaul nodes (IAB nodes). The IAB nodes may have all the functions of a base station, or may only have the data forward function similar to the base station. The network side node connected via a wired interface is the base station, which is referred to as a donor base station (or DgNB) in embodiments of the present disclosure. The donor base station communicates with the wireless backhaul nodes via wireless interfaces. The wireless backhaul nodes also communicate with one another via a wireless interface.

The donor base stations according to embodiments of the present disclosure are typically connected to each other via wired connections, and the donor base station and the core network node are typically also connected via wired connections. The donor base station according to embodiments of the present disclosure may be a commonly used base station, an evolved node base station (eNB), a network side device in the 5G system, such as a next generation node base station (gNB) or a transmission and reception point (TRP), or the like. A wireless backhaul node according to embodiments of the present disclosure may have all the functions of the base station, or may only have the data forward function similar to the base station. The terminal according to embodiments of the present disclosure may be specifically a mobile phone (or a handset) or another device capable of transmitting or receiving wireless signals, including user equipment (UE), a personal digital assistant (PDA), a wireless modem, a wireless communication device, a handheld device, a laptop computer, a cordless phone, a wireless local loop (WLL) station, customer premise equipment (CPE) or a mobile smart hotspot that can convert mobile signals into WiFi signals, a smart appliance, a device that can communicate with a mobile communication network autonomously without human intervention, or the like.

In embodiments of the present disclosure, a previous hop node of a certain wireless backhaul node refers to a node where the previous hop occurs in the wireless backhaul path from the Donor base station, sequentially through one or more wireless backhaul nodes, to the terminal. That is, the previous hop node of a certain wireless backhaul node is an upper-layer parent node for the wireless backhaul node.

Figure 5:
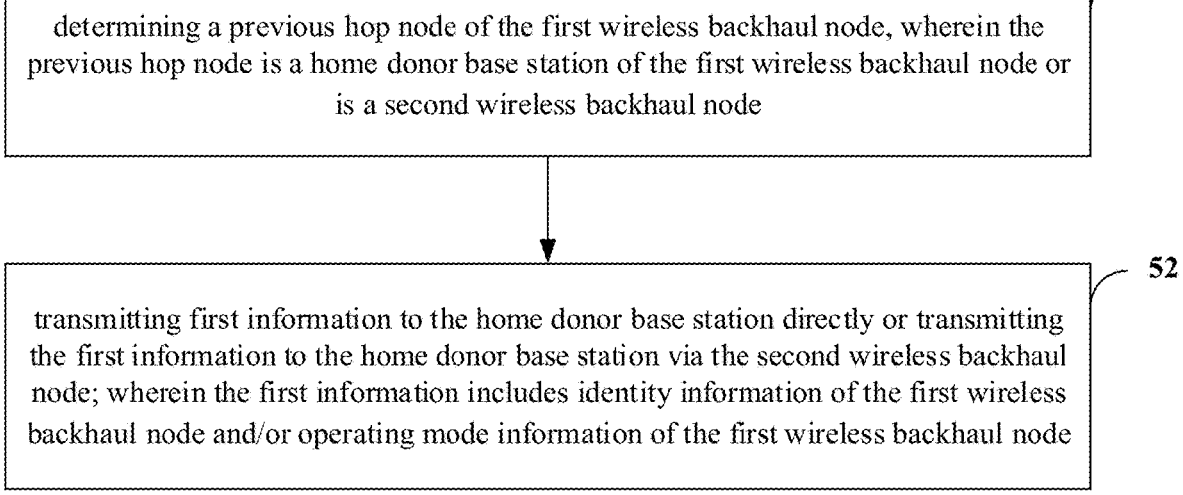
FIG. 5 is a first flow diagram of an access method according to an embodiment of the present disclosure.

Referring to FIG. 5, an access method according to an embodiment of the present disclosure applied to a first wireless backhaul node includes the following steps.

A Step 51: determining a previous hop node of the first wireless backhaul node, wherein the previous hop node is a home donor base station of the first wireless backhaul node or is a second wireless backhaul node.

Here, the previous hop node needs to be determined when the first wireless backhaul node newly accesses a network. The previous hop node refers to the upper-layer parent node of the first wireless backhaul node, namely a previous hop node of the first wireless backhaul node that is in the wireless backhaul path. The wireless backhaul path is a transmission path from the Donor base station, sequentially through one or more wireless backhaul nodes, to the first wireless backhaul node.

In embodiments of the present disclosure, the first wireless backhaul node may access a certain donor base station directly (this connection manner is also called a one-hop scenario in embodiments of the present disclosure), or access a certain donor base station through one or more wireless backhaul nodes (this connection manner is also called a multi-hop scenario in embodiments of the present disclosure). The donor base station that the first wireless backhaul node accesses either directly or through one or more wireless backhaul nodes is the home donor base station of the first wireless backhaul node. Therefore, the previous hop node of the first wireless backhaul node may be the home donor base station or another wireless backhaul node (designated as a second wireless backhaul node herein).

A Step 52: transmitting first information to the home donor base station directly or transmitting the first information to the home donor base station via the second wireless backhaul node; wherein the first information includes identity information of the first wireless backhaul node and/or operating mode information of the first wireless backhaul node.

Here, the first wireless backhaul node transmits the first information to the home donor base station directly or indirectly. The first information includes identity information of the first wireless backhaul node and/or operating mode information of the first wireless backhaul node. Specifically, the identity information can be represented by the node identifier of the first wireless backhaul node. The operating mode information of the first wireless backhaul node may include one or a combination of: 1) indication information indicating that the first wireless backhaul node operates in a Layer 3 (L3) mode or Layer 2 (L2) mode; 2) indication information indicating that the first wireless backhaul node is visible or invisible to a predetermined node, wherein the predetermined node includes a core network node and/or a radio access network (RAN) side node other than the first wireless backhaul node; 3) indication information indicating that the first wireless backhaul node operates in the 5G cell mode or DU mode; 4) indication information indicating two operating modes supported by the first wireless backhaul node simultaneously.

In a specific implementation, the identity information (such as the node identifier) of the first wireless backhaul node may include information indicating the type of the node (for example, indicating that the node is a 5G wireless backhaul node, the node is a Layer 3 or Layer 2 node, or the like). Similarly, the operating mode information of the first wireless backhaul node can also implicitly indicate the identity information of the node.

Specifically, if the previous hop node is the home donor base station of the first wireless backhaul node, then in the foregoing Step 52, the first wireless backhaul node can transmit the first information to the home donor base station directly through one of the following messages: Msg1 of a random access procedure; a radio resource control (RRC) connection establishment request message; an RRC connection establishment completion message; a predefined message dedicated to report of identity characteristics information and other uplink messages. In embodiments of the present disclosure, in consideration of both the overhead and the timeliness of the report, the identity information and operating mode information are preferably carried in the RRC connection establishment completion message for transmission, so that upon completion of the RRC connection establishment, the home donor base station can obtain the identity information or operating mode information of the first wireless backhaul node.

If the previous hop node is the second wireless backhaul node, then in the foregoing Step 52, the first wireless backhaul node can transmit the first information over a path and bearer already established between the second wireless backhaul node and the home donor base station. Or, the first wireless backhaul node triggers an establishment of a path and bearer between the second wireless backhaul node and the home donor base station and transmits the first information over the newly established path and bearer.

As the home donor base station generally has already known which AMFs can support a 5G wireless backhaul node and what operating modes are supported when the home donor base station is setting up its own Ng interface (the interface between the DgNB and the AMF), the home donor base station can select a suitable core network node based on the identity information and/or operating mode information of the first wireless backhaul node when it is selecting the AMF for the first wireless backhaul node making a new access attempt. For example, the home donor base station selects an AMF supporting the first wireless backhaul node (e.g., supporting the 5G wireless backhaul node) and having a matching operating mode. Accordingly, the home donor base station can also transmit the identity information and/or operating mode information of the first wireless backhaul node to the corresponding core network node, so that the core network node may conduct corresponding operations.

The first wireless backhaul node making a new access attempt subsequently needs to complete identity authentication and validation as the network node and download from the OAM entity of the core network detailed configuration information for network node operation, such as operation frequency, operation bandwidth, other operation parameters or the like.

Specifically, in embodiments of the present disclosure, after transmitting the first information, the first wireless backhaul node can perform subsequent access procedure according to its operating mode. Specifically, if the operating mode of the first wireless backhaul node is the Layer 3 mode, is visible to a predetermined node or is the 5G cell mode, then the first wireless backhaul node can initiate an Ng interface setup process and Xn interface setup process with the home donor base station; and/or if the operating mode of the first wireless backhaul node is the Layer 2 mode, is invisible to the predetermined node or is the DU mode, then the first wireless backhaul node initiates an F1 interface setup process with the home donor base station.

Figure 6:
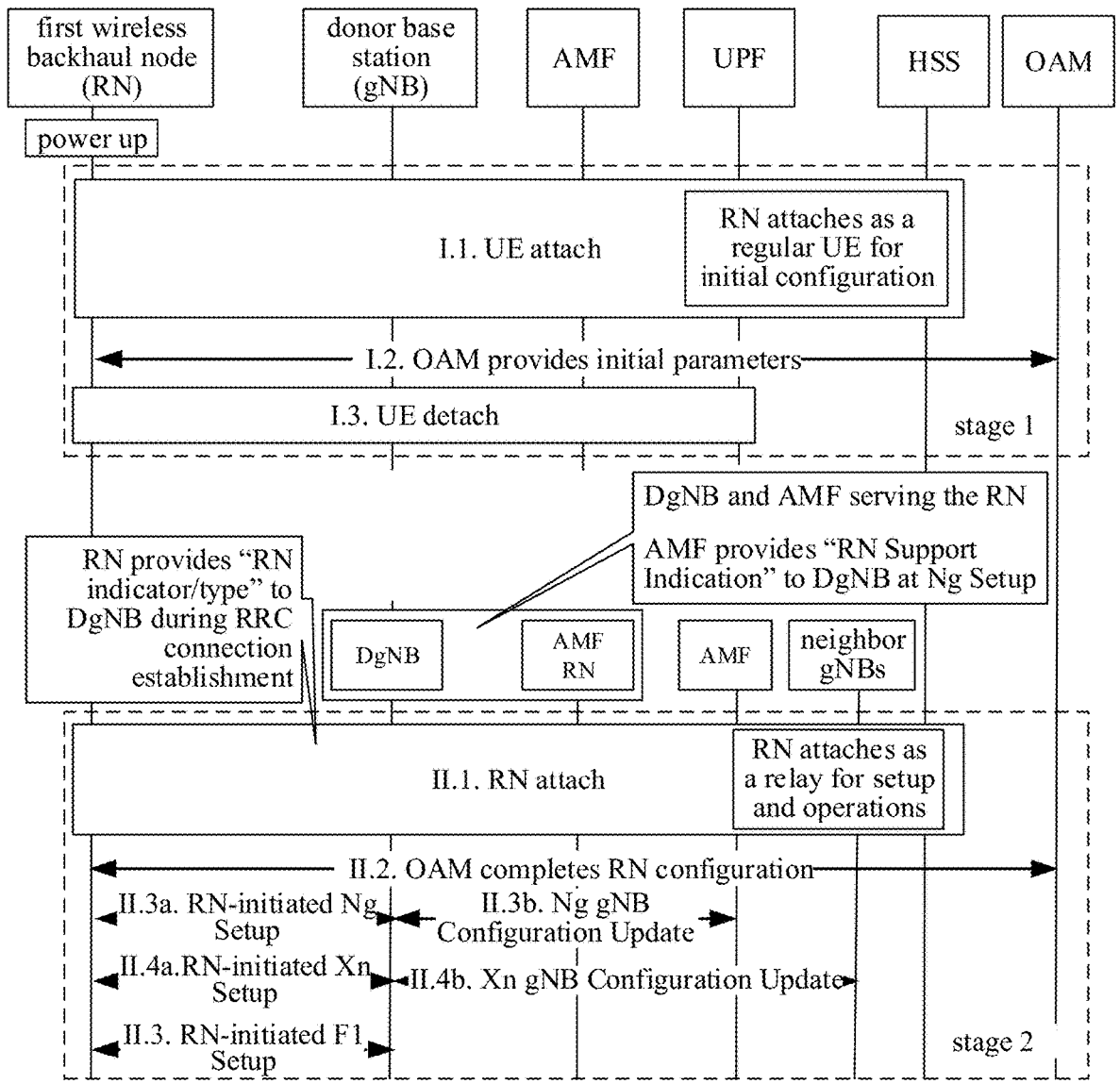
FIG. 6 is a schematic diagram illustrating message interactions in an access method according to an embodiment of the present disclosure.

For example, if the first wireless backhaul node is a 5G wireless backhaul node operating in the L3 mode or 5G cell mode, then the first wireless backhaul node needs to be visible to core network nodes and other RAN side nodes, and in selecting the AMF for the first wireless backhaul node, an AMF supporting the above operating modes of the first wireless backhaul node needs to be selected. An address of the central unit-user plane (CU-UP) of the home donor base station can be used as the UPF address of the first wireless backhaul node directly, so that the home donor base station can perform UPF function of the first wireless backhaul node by proxy. Accordingly, the first wireless backhaul node can subsequently initiate an Ng interface setup process (II.3a. RN-initiated Ng Setup) with the home donor base station. Since the home donor base station implements the Ng interface of the first wireless backhaul node by proxy, the home donor base station initiates an Ng interface modification process (II.3b. Ng gNB Configuration Update) with a core network node, such as a first AMF entity, to notify the core network node that a new subordinate cell is added for this donor base station. For the above process, references may be made to Steps II.3a to II.3b as shown in FIG. 6. A similar process may be performed for an Xn interface. The first wireless backhaul node can initiate an Xn interface setup process (II.4a. RN-initiated Xn Setup) with the home donor base station. Since the home donor base station implements the Xn interface of the first wireless backhaul node by proxy, the home donor base station initiates an Xn interface modification process (II.4b. Xn gNB Configuration Update) with other base station, such as a base station other than the home donor base station, to notify other RAN nodes that a new subordinate cell is added for this donor base station. For the above process, references may be made to Steps II.4a to II.4b as shown in FIG. 6.

For example, if the first wireless backhaul node is a 5G wireless backhaul node operating in the L2 mode or 5G DU mode, then the outside core network node and other RAN side nodes are invisible to the first wireless backhaul node making the new access attempt and thus the Xn and Ng interface setup and modification processes may not be necessary. However, an F1 interface needs to be set up between the home donor base station and the first wireless backhaul node making the new access attempt (II.3. RN-initiated F1 Setup). For the above process, references may be made to Step II.3 as shown in FIG. 6. Of course, it may be necessary to perform a process similar to Steps II.4a to II.4b for some architectures.

In embodiments of the present disclosure, through the steps described above, the first wireless backhaul node transmits the identity information and/or operating mode information to the home donor base station, so that the home donor base station can select a suitable core network node for the first wireless backhaul node and perform the processing of subsequent access procedure based on the identity information and/or operating mode information during an access process of the first wireless backhaul node, thereby improving the access efficiency of accessing a network by the first wireless backhaul node.

In the above Step 51, the first wireless backhaul node can determine a range of selectable cells based on pre-acquired relevant node information on a node capable of providing a wireless backhaul service, the relevant node information including at least one of: a donor base station identifier, donor base station cell list information, a wireless backhaul node identifier, and wireless backhaul node cell list information; and then based on signal qualities of searched cells, select a cell satisfying predefined conditions from the range of selectable cells and access the cell, wherein the previous hop node is the donor base station (one-hop scenario) or a wireless backhaul node (multi-hop scenario) that the accessed cell belongs to. Here, the relevant node information further includes the type of wireless backhaul service supported by the cell. The types of wireless backhaul service include Layer 2 wireless backhaul service and Layer 3 wireless backhaul service. The predefined conditions may include at least one of the following conditions: the cell can provide wireless backhaul service corresponding to the operating mode of the first wireless backhaul node, the quality of the link from the cell to the first wireless backhaul node satisfies predefined requirements, and the cell allows access by a new first wireless backhaul node.

Specifically, the relevant node information on a node configured to provide a wireless backhaul service can be obtained in the stage 1 as shown in FIG. 6. That is, prior to the above Step 51, the first wireless backhaul node, upon power-up, accesses the network as user equipment (UE), transmits a request message to the operation, administration, and maintenance (OAM) function entity of the core network, and receives relevant node information on a node configured to provide a wireless backhaul service that is returned from the OAM entity based on the request message. For the above process, references may be made to Steps I.1 to I.2 as shown in FIG. 6. The Step I.1 includes "UE attach", in which an RN attaches as a regular UE for initial configuration, and the Step I.2 includes "OAM provides initial parameters". In addition, FIG. 6 includes, for example, the following steps: Step I.3, including "UE detach"; Step II.1, including "RN attach", in which an RN attaches as a relay for setup and operations; and Step II.2, including "OAM completes RN configuration". In addition, FIG. 6 includes the following annotations: "RN provides "RN indicator/type" to DgNB during RRC connection establishment"; "DgNB and AMF serving the RN"; and "AMF provides "RN Support Indication" to DgNB at Ng Setup".

Described above is the processing flow of the first wireless backhaul node during a network access process. Hereinafter, the processing flow of the donor base station during the network access process will be further explained.

Figures 7, 8:
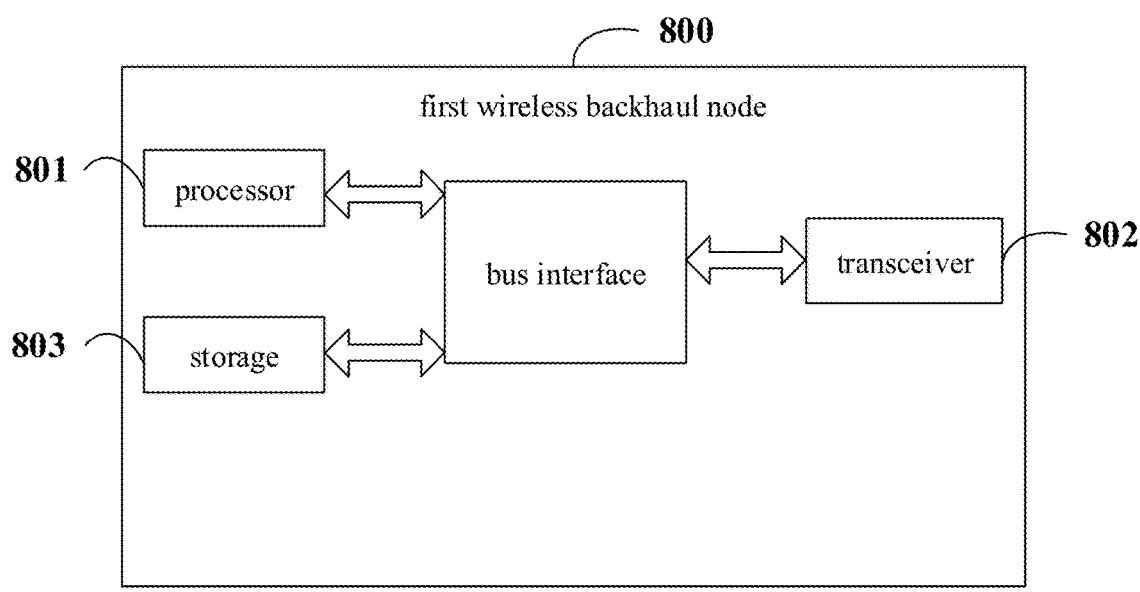
FIG. 7 is a second flow diagram of an access method according to an embodiment of the present disclosure.
FIG. 8 is a first structural view of a first wireless backhaul node according to an embodiment of the present disclosure.

Referring to FIG. 7, an access method according to an embodiment of the present disclosure is applied to a home donor base station of a first wireless backhaul node and includes the following steps.

A Step 71: receiving, by the home donor base station, first information transmitted by the first wireless backhaul node, wherein the first information includes identity information of the first wireless backhaul node and/or operating mode information of the first wireless backhaul node.

Here, the home donor base station receives the first information through one of the following messages: Msg1 of a random access procedure; an RRC connection establishment request message; an RRC connection establishment completion message; a predefined message dedicated to report of identity characteristics information; and other uplink messages.

Specially, the operating mode information of the first wireless backhaul node includes one or a combination of: indication information indicating that the first wireless backhaul node operates in the Layer 3 mode or Layer 2 mode; indication information indicating that the first wireless backhaul node is visible or invisible to a predetermined node, wherein the predetermined node includes a core network node and/or an RAN side node other than the first wireless backhaul node; indication information indicating that the first wireless backhaul node operates in the 5G cell mode or DU mode; and indication information indicating two operating modes supported by the first wireless backhaul node simultaneously.

In embodiments of the present disclosure, through the process described above, the home donor base station according to embodiments of the present disclosure can obtain the identity information and/or operating mode information of the first wireless backhaul node during the network access process of the first wireless backhaul node, so that the home donor base station can select a suitable core network node for the first wireless backhaul node and perform the processing of the subsequent access process based on the identity information and/or operating mode information, thereby improving the access efficiency of accessing a network by the first wireless backhaul node.

Subsequent to the above Step 71, the home donor base station selects a corresponding first core network node for the first wireless backhaul node based on the first information and transmits the first information to the first core network node.

Further, if an operating mode of the first wireless backhaul node is the Layer 3 mode or is visible to the predetermined node or is the 5G cell mode, then during the network access process of the first wireless backhaul node, the home donor base station in embodiments of the present disclosure can set up an Ng interface in response to the Ng interface setup process initiated by the first wireless backhaul node and initiate an Ng interface modification process with a first AMF entity; and set up an Xn interface in response to the Xn interface setup process initiated by the first wireless backhaul node and initiate an Xn interface modification process with another base station; and/or, if the operating mode of the first wireless backhaul node is the Layer 2 mode or is invisible to the predetermined node or is the DU mode, then the home donor base station can set up an F1 interface in response to the F1 interface setup process initiated by the first wireless backhaul node.

A more detailed processing flow of the first wireless backhaul node in the access method according to an embodiment of the present disclosure will be explained below by referring to FIG. 6 and taking a one-hop scenario for example.

In stage 1 as shown in FIG. 6, upon initial power-up of the first wireless backhaul node (also denoted here as the radio node (RN)), the node does not know about the surrounding network environment. Here, the term "network environment" mainly refers to which existing nodes can provide wireless backhaul services, their respective service levels, or the like. In embodiments of the present disclosure, network environment related information can be obtained in two manners. In a first manner, the first wireless backhaul node requests this information from the network. Prior to the request for this information, the first wireless backhaul node first establishes a connection with the network. In a second manner, the first wireless backhaul node can acquire the network environment related information from system broadcast or other notifications actively transmitted by surrounding existing network nodes. Illustration is made with respect to the first manner in FIG. 6.

As shown in FIG. 6, upon the power-up of the first wireless backhaul node, it first behaves like UE, searches for cells on which it can camp, camps on a certain cell and then establishes a connection to the network via this cell. This process mainly includes: the first wireless backhaul node initiates a random access process, establishes an RRC connection, and then initiates an attachment process, an authentication process and the like with the core network. Upon success of authentication, the first wireless backhaul node requests, from the OAM entity, relevant node information on a node configured to provide a wireless backhaul service. The relevant node information may include a DgNB that can provide the first wireless backhaul node with wireless backhaul services and/or cell list information of the DgNB that can provide the first wireless backhaul node with wireless backhaul services. Optionally, the RN information can further include detailed service information of each cell that can provide backhaul services, e.g., the cell is capable of providing L2 wireless backhaul services or L3 wireless backhaul services, or supporting the L2 and L3 wireless backhaul services simultaneously, or the like. After the first wireless backhaul node acquires the RN information, the first wireless backhaul node can be detached from the network through a detach process. For example, the first wireless backhaul node can be shut down or rebooted.

At this point, the first wireless backhaul node completes the first attachment to the network side and obtains relevant node information on surrounding nodes configured to provide wireless backhaul services during the first initial access in Stage 1. The relevant node information includes for example list of cells configured to provide a wireless backhaul service, and possibly includes detailed information on various types of service provided by each cell.

After completion of the first initial access, the first wireless backhaul node can access the network as a network node in Stage 2. In stage 1, the first wireless backhaul node obtains relevant node information on a node configured to provide a wireless backhaul service. Next, the first wireless backhaul node searches in the surroundings again. The first wireless backhaul node selects a cell satisfying predefined conditions as its Donor cell in comprehensive consideration of the signal qualities of searched cells and the relevant node information on a node configured to provide a wireless backhaul service obtained in Stage 1, such as information on a DgNB cell configured to provide a wireless backhaul service. The donor base station to which this Donor cell belongs is the home donor base station of the first wireless backhaul node. The foregoing predefined conditions may include the following conditions:

1) The Donor cell can provide wireless backhaul services needed by the first wireless backhaul node.

For example, if the first wireless backhaul node is an L2 device, then it is required that the Donor cell can provide at least L2 wireless backhaul services.

2) The quality of a link from the Donor cell to the first wireless backhaul node satisfies predefined communication conditions.

If more than one cell satisfies the communication conditions, the Donor cell can be selected according to a ranking of the signal qualities of these cells.

3) The current state of the Donor cell allows access by a new wireless backhaul node.

For example, the Donor cell does not forbid access by the wireless backhaul node due to its own load or other abnormal situations.

After selecting a suitable Donor cell according to the above predefined conditions, the first wireless backhaul node initiates an access process with the Donor cell again. During the access process, an RRC connection is first established with the Donor cell through a random access procedure. During establishment of the RRC connection, the first wireless backhaul node can report the first information (i.e., the identity information and/or operating mode information of the first wireless backhaul node) to the home donor base station.

As can be seen from the above process, different types of wireless backhaul nodes may have different core network node selection processes and different interface setup processes. Therefore, in the access process in FIG. 6, the first information can be reported as early as possible through uplink signaling (such as messages in an RRC connection process) in embodiments of the present disclosure, which also lays the foundation for subsequent normal operations of the wireless backhaul node.

In the above description, the access process of the wireless backhaul node in the one-hop scenario is explained with reference to FIG. 6. For a multi-hop scenario, the first wireless backhaul node making a new access attempt may be accessing another wireless backhaul node (here designated as a second wireless backhaul node). The second wireless backhaul node may access the donor base station either directly or possibly through one or more wireless backhaul nodes. The differences between a process in the multi-hop scenario and a process in the one-hop scenario will be described hereinafter.

In the one-hop scenario, after the initial power-up of the first wireless backhaul node in a new network environment, the first wireless backhaul node performs the first network access process as regular UE. The first wireless backhaul node selects the cell to camp on in the same manner as UE, therefore, as UE, the first wireless backhaul node cannot determine whether the selected cell is a Donor cell or a cell of a wireless backhaul node. In the multi-hop scenario, the first wireless backhaul node can also select the cell to camp on and the cell to access in a similar process to that in the one-hop scenario.

The difference in the random access and RRC connection establishment procedure of the first network access process between the two scenarios lies mainly in the processing flow on the network side. When the first wireless backhaul node accesses the donor base station directly, the MAC function and the RRC function of the random access processing entity reside in the same entity, and the RRC connection and bearer are directly established between the first wireless backhaul node making a new access attempt and the donor base station, which result in a relatively simple architecture. When the first wireless backhaul node accesses an L2 second wireless backhaul node, as the second wireless backhaul node only has Layer 2 functions, which means that the MAC function and the RRC function are separately located, and bearer establishment and management have to involve multiple nodes, a relatively complicated architecture may result. However, for any one wireless backhaul node that has started normal operation and can accept users (such as the second wireless backhaul node), the path and bearer to the network generally has already been established. Therefore, for a first wireless backhaul node making a new access attempt, the data may simply be transmitted over the existing path and bearer. Or, if there is no suitable path and bearer currently, establishment of new path and bearer can be triggered and transmission can be made over the newly established path and bearer.

In addition, in the multi-hop scenario, during the first access process of the first wireless backhaul node making a new access attempt, the first information downloaded from the OAM entity by the first wireless backhaul node may include not only the donor base station and its cell list information, but also information on all the cells of one-hop wireless backhaul nodes or multi-hop wireless backhaul nodes that can further accept the first wireless backhaul node. That is, the cell list information downloaded from the OAM entity includes information on other RNs that have already established connections, therefore the first wireless backhaul node can select one from these cells, and access the selected cell as a network node.

Similarly, in stage 2, as for the transmission path, the first wireless backhaul node making a new access attempt can reach the home donor base station via a multi-hop path. The path and bearer from each node to the home donor base station in the multi-hop path can be normally established and maintained. Therefore, the first wireless backhaul node can interact with the home donor base station by using an existing path and bearer or a new path and bearer established as triggered.

It is noted that, if all the multi-hop nodes along the path are L2 wireless backhaul devices, as none of these device has complete functions of a donor base station, all the interfaces, RRC connections and the like for the first wireless backhaul node making a new access attempt are established and maintained directly with the home donor base station, and each hop node in the multi-hop path merely participates in data transmission. If the multi-hop nodes along the path include an L3 wireless backhaul node, which means that the L3 wireless backhaul node has the function of a donor base station, then the interfaces and RRC connections for the first wireless backhaul node can terminate at the L3 wireless backhaul node closest to the first wireless backhaul node in the multi-hop path, or can terminate at the home donor base station.

On the basis of the methods described above, the present disclosure further provides, in some embodiments, devices for implementing the methods.

Referring to FIG. 8, a schematic structural view of a first wireless backhaul node 800 according to an embodiment of the present disclosure is illustrated. The first wireless backhaul node 800 includes a processor 801, a transceiver 802, a storage 803, and a bus interface.

In embodiments of the present disclosure, the first wireless backhaul node 800 further includes a program stored in the storage 803 and configured to be executed by the processor 801.

The processor 801 is configured to read the program from the storage to perform the following process: determining a previous hop node of the first wireless backhaul node, wherein the previous hop node is a home donor base station of the first wireless backhaul node or is a second wireless backhaul node.

The transceiver 802 is configured to transmit first information to a home donor base station directly or transmit the first information to the home donor base station via the second wireless backhaul node; wherein the first information includes identity information of the first wireless backhaul node and/or operating mode information of the first wireless backhaul node.

In FIG. 8, the bus architecture may include any quantity of interconnected busses and bridges, and various circuits including specifically one or more processors represented by the processor 801 and storage represented by the storage 803 are linked together. The bus architecture can also link various other circuits, such as peripherals, voltage regulators, and power management circuits. As these are well known in the art, a detailed description thereof is omitted herein. The bus interface provides interfaces. The transceiver 802 may include multiple elements, including a transmitter and a receiver, to provide units configured to communicate with various other devices over transmission media.

The processor 801 is responsible for management of the bus architecture and regular processing. The storage 803 can store the data used by the processor 801 during operation.

Optionally, the transceiver 802 is further configured to transmit the first information to the home donor base station directly through one of the following messages: Msg1 of a random access procedure; an RRC connection establishment request message; an RRC connection establishment completion message; a predefined message dedicated to report of identity characteristics information; other uplink messages.

Optionally, the operating mode information of the first wireless backhaul node includes one or a combination of: indication information indicating that the first wireless backhaul node operates in the Layer 3 mode or Layer 2 mode; indication information indicating that the first wireless backhaul node is visible or invisible to a predetermined node, wherein the predetermined node includes a core network node and/or an RAN side node other than the first wireless backhaul node; indication information indicating that the first wireless backhaul node operates in the 5G cell mode or DU mode; and indication information indicating two operating modes supported by the first wireless backhaul node simultaneously.

Optionally, the transceiver 802 is further configured to: after transmitting the first information, if an operating mode of the first wireless backhaul node is the Layer 3 mode or is visible to the predetermined node or is the 5G cell mode, initiate an Ng interface setup process and an Xn interface setup process with the home donor base station; and/or, if an operating mode of the first wireless backhaul node is the Layer 2 mode or is invisible to the predetermined node or is the DU mode, initiate an F1 interface setup process with the home donor base station.

Optionally, the processor 801 is further configured to determine a range of selectable cells based on pre-acquired relevant node information on a node configured to provide a wireless backhaul service, wherein the relevant node information includes at least one of: a donor base station identifier, donor base station cell list information, a wireless backhaul node identifier, and wireless backhaul node cell list information; and based on signal qualities of searched cells, select a cell satisfying predefined conditions from the range of selectable cells and access the cell, wherein the previous hop node is a donor base station or a wireless backhaul node that the accessed cell belongs to.

Optionally, the relevant node information further includes the type of wireless backhaul service supported by the cell. The types of the wireless backhaul service include a Layer 2 wireless backhaul service and a Layer 3 wireless backhaul service.

Optionally, the predefined conditions may include at least one of the following conditions: the cell can provide a wireless backhaul service corresponding to the operating mode of the first wireless backhaul node, the quality of the link from the cell to the first wireless backhaul node satisfies predefined requirements, and the cell allows access by a new first wireless backhaul node.

Optionally, the transceiver 802 is further configured to transmit a request message to the OAM function entity of the core network and receive the relevant node information on a node configured to provide a wireless backhaul service that is returned from the OAM entity based on the request message.

Optionally, the transceiver 802 is further configured to transmit the first information over a path and bearer already established between the second wireless backhaul node and the home donor base station; or trigger the establishment of a new path and bearer between the second wireless backhaul node and the home donor base station, and transmit the first information over the newly established path and bearer.

Figure 9:
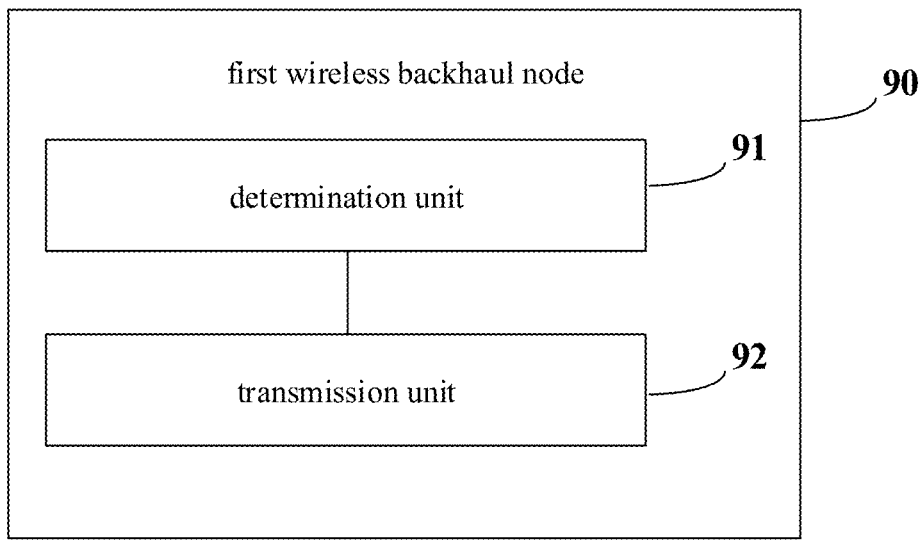
FIG. 9 is a second structural view of a first wireless backhaul node according to an embodiment of the present disclosure.

Referring to FIG. 9, another structure of a first wireless backhaul node 90 according to an embodiment of the present disclosure is illustrated. As shown in FIG. 9, the first wireless backhaul node 90 includes: a determination unit 91 configured to determine a previous hop node of the first wireless backhaul node, wherein the previous hop node is a home donor base station of the first wireless backhaul node or is a second wireless backhaul node; and a transmission unit 92 configured to transmit first information to the home donor base station directly or transmit the first information to the home donor base station via the second wireless backhaul node, wherein the first information includes identity information of the first wireless backhaul node and/or operating mode information of the first wireless backhaul node.

Optionally, the transmission unit 92 is specifically configured to transmit the first information to the home donor base station directly through one of the following messages: Msg1 of a random access procedure; a radio resource control (RRC) connection establishment request message; an RRC connection establishment completion message; a predefined message dedicated to report of identity characteristics information; other uplink messages.

Optionally, the operating mode information of the first wireless backhaul node includes one or a combination of: indication information indicating that the first wireless backhaul node operates in the Layer 3 mode or Layer 2 mode; indication information indicating that the first wireless backhaul node is visible or invisible to a predetermined node, wherein the predetermined node includes a core network node and/or an RAN side node other than the first wireless backhaul node; indication information indicating that the first wireless backhaul node operates in the 5G cell mode or distributed unit (DU) mode; and indication information indicating two operating modes supported by the first wireless backhaul node simultaneously.

Optionally, the first wireless backhaul node 90 further includes: a setup unit configured to, if the operating mode of the first wireless backhaul node is the Layer 3 mode, is visible to the predetermined node or is the 5G cell mode, initiate an Ng interface setup process and an Xn interface setup process with the home donor base station; and/or if the operating mode of the first wireless backhaul node is the Layer 2 mode, is invisible to the predetermined node or is the DU mode, initiate an F1 interface setup process with the home donor base station.

Optionally, the determination unit 91 is further configured to determine a range of selectable cells based on pre-acquired relevant node information on a node configured to provide a wireless backhaul service, wherein the relevant node information includes at least one of: a donor base station identifier, donor base station cell list information, a wireless backhaul node identifier, wireless backhaul node cell list information; and based on signal qualities of searched cells, select a cell satisfying predefined conditions from the range of selectable cells and access the cell, wherein the previous hop node is a donor base station or a wireless backhaul node that the accessed cell belongs to.

Optionally, the relevant node information further includes the type of wireless backhaul service supported by the cell. The types of wireless backhaul service include Layer 2 wireless backhaul service and Layer 3 wireless backhaul service.

Optionally, the predefined conditions include at least one of the following conditions: the cell can provide a wireless backhaul service corresponding to the operating mode of the first wireless backhaul node, the quality of the link from the cell to the first wireless backhaul node satisfies predefined requirements, and the cell allows access by a new first wireless backhaul node.

Optionally, the first wireless backhaul node 90 further includes: a relevant node information request unit configured to transmit a request message to the operation, administration, and maintenance (OAM) function entity of the core network and receive the relevant node information on a node configured to provide a wireless backhaul service that is returned from the OAM entity based on the request message.

Optionally, the transmission unit 92 is specifically configured to transmit the first information over a path and bearer already established between the second wireless backhaul node and the home donor base station; or trigger the establishment of a new path and bearer between the second wireless backhaul node and the home donor base station, and transmit the first information over the newly established path and bearer.

Figure 10:
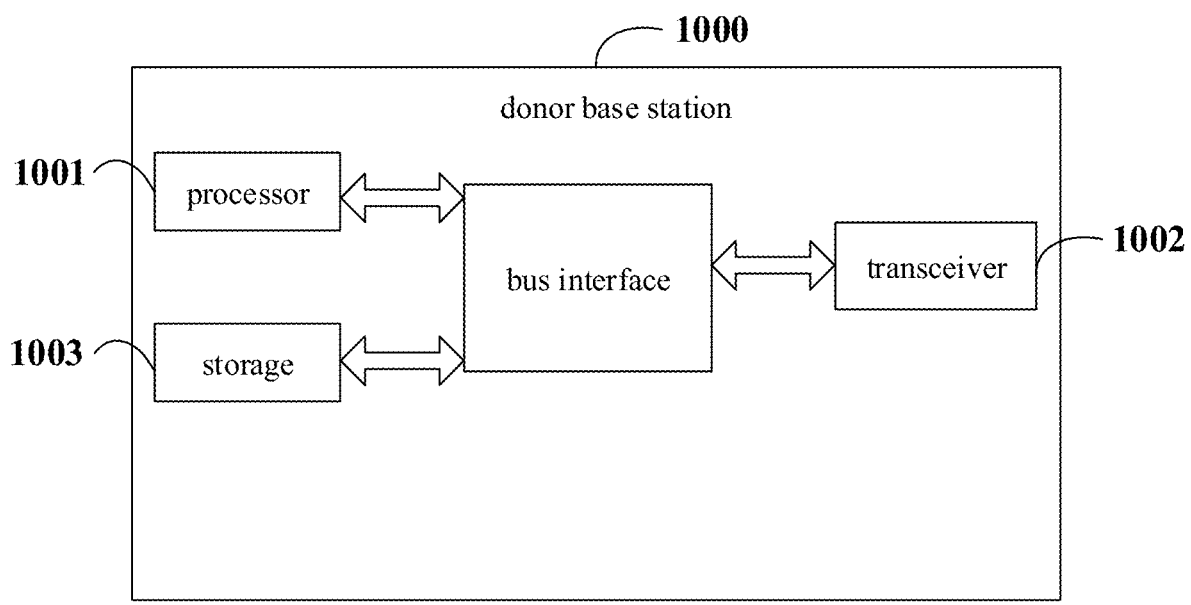
FIG. 10 is a first structural view of a donor base station according to an embodiment of the present disclosure.

Referring to FIG. 10, a schematic structural view of a donor base station 1000 according to an embodiment of the present disclosure is illustrated. The donor base station is the home donor base station of the first wireless backhaul node. As shown in FIG. 10, the donor base station 1000 includes a processor 1001, a transceiver 1002, a storage 1003 and a bus interface.

In embodiments of the present disclosure, the donor base station 1000 further includes a program stored in the storage 1003 and configured to be executed by the processor 1001.

The transceiver 1002 is configured to receive first information transmitted by the first wireless backhaul node, wherein the first information includes identity information of the first wireless backhaul node and/or operating mode information of the first wireless backhaul node.

In FIG. 10, the bus architecture may include any quantity of interconnected busses and bridges, and various circuits including specifically one or more processors represented by the processor 1001 and storage represented by the storage 1003 are linked together. The bus architecture can also link various other circuits, such as peripherals, voltage regulators, and power management circuits. As these are well known in the art, a detailed description thereof is omitted herein. The bus interface provides interfaces. The transceiver 1002 may include multiple elements, including a transmitter and a receiver, to provide units configured to communicate with various other devices over transmission media.

The processor 1001 is responsible for management of the bus architecture and regular processing. The storage 1003 can store the data used by the processor 1001 during operation.

Optionally, the transceiver 1002 is further configured to receive the first information through one of the following messages: Msg1 of a random access procedure; an RRC connection establishment request message; an RRC connection establishment completion message; a predefined message dedicated to report of identity characteristics information; other uplink messages.

Optionally, the operating mode information of the first wireless backhaul node includes one or a combination of: indication information indicating that the first wireless backhaul node operates in the Layer 3 mode or Layer 2 mode; indication information indicating that the first wireless backhaul node is visible or invisible to a predetermined node, wherein the predetermined node includes a core network node and/or an RAN side node other than the first wireless backhaul node; indication information indicating that the first wireless backhaul node operates in the 5G cell mode or DU mode; and indication information indicating two operating modes supported by the first wireless backhaul node simultaneously.

Optionally, the processor 1001 is configured to read the program from the storage to perform the following process: selecting a corresponding first core network node for the first wireless backhaul node based on the first information; the transceiver 1002 is further configured to transmit the first information to the first core network node.

Optionally, the processor 1001 is further configured to, if an operating mode of the first wireless backhaul node is the Layer 3 mode or is visible to the predetermined node or is the 5G cell mode, set up an Ng interface in response to the Ng interface setup process initiated by the first wireless backhaul node and initiate an Ng interface modification process with a first AMF entity; and set up an Xn interface in response to the Xn interface setup process initiated by the first wireless backhaul node and initiate an Xn interface modification process with another base station; and/or if the operating mode of the first wireless backhaul node is the Layer 2 mode or is invisible to the predetermined node or is the DU mode, set up an F1 interface in response to the F1 interface setup process initiated by the first wireless backhaul node.

Figure 11:
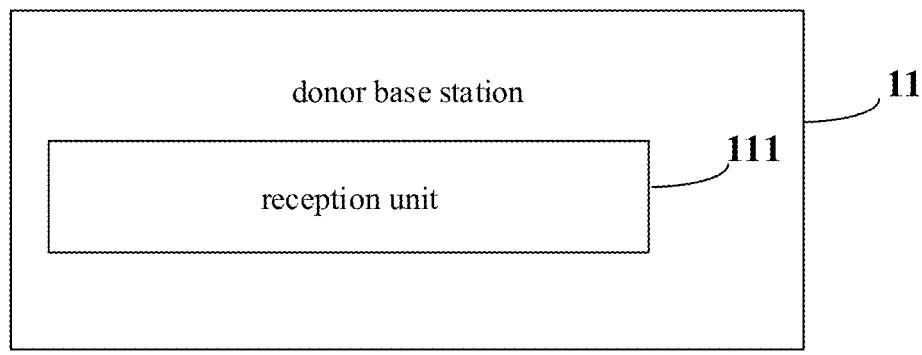
FIG. 11 is a second structural view of a donor base station according to an embodiment of the present disclosure.

Referring to FIG. 11, another structure of a donor base station 110 according to an embodiment of the present disclosure is illustrated. The donor base station is the home donor base station of the first wireless backhaul node. As shown in FIG. 11, the donor base station 110 includes a reception unit 111 configured to receive first information transmitted by the first wireless backhaul node, wherein the first information includes identity information of the first wireless backhaul node and/or operating mode information of the first wireless backhaul node.

Optionally, the reception unit 111 is further configured to receive the first information through one of the following messages: Msg1 of a random access procedure; an RRC connection establishment request message; an RRC connection establishment completion message; a predefined message dedicated to report of identity characteristics information; other uplink messages.

Optionally, the operating mode information of the first wireless backhaul node includes one or a combination of: indication information indicating that the first wireless backhaul node operates in the Layer 3 mode or Layer 2 mode; indication information indicating that the first wireless backhaul node is visible or invisible to a predetermined node, the predetermined node including a core network node and/or an RAN side node other than the first wireless backhaul node; indication information indicating that the first wireless backhaul node operates in the 5G cell mode or DU mode; and indication information indicating two operating modes supported by the first wireless backhaul node simultaneously.

Optionally, the donor base station 110 further includes a selection unit configured to select a corresponding first core network node for the first wireless backhaul node based on the first information and transmit the first information to the first core network node.

Optionally, the donor base station 110 further includes: a setup unit configured to, if an operating mode of the first wireless backhaul node is the Layer 3 mode or is visible to the predetermined node or is the 5G cell mode, set up an Ng interface in response to the Ng interface setup process initiated by the first wireless backhaul node and initiate an Ng interface modification process with a first AMF entity; and set up an Xn interface in response to the Xn interface setup process initiated by the first wireless backhaul node and initiate an Xn interface modification process with another base station; and/or if the operating mode of the first wireless backhaul node is the Layer 2 mode or is invisible to the predetermined node or is the DU mode, set up an F1 interface in response to the F1 interface setup process initiated by the first wireless backhaul node.

The steps of the method or algorithm described in the present disclosure can be implemented in hardware or implemented by a processor executing software instructions. Software instructions may be composed of corresponding software modules that can be stored in a random access memory (RAM), flash memory, read-only memory (ROM), erasable programmable ROM (EPROM), electrically EPROM (EEPROM), register, hard disk, removable hard disk, compact disc read-only memory (CD-ROM) or any other storage medium well known in the art. An exemplary storage medium is coupled to a processor so that the processor can read information from the storage medium and write information to the storage medium. Of course, the storage medium can also be an integral part of the processor. The processor and the storage medium may be located in an application specific integrated circuit (ASIC). In addition, the ASIC may be located in the core network interface device. Of course, the processor and the storage medium can also reside as discrete components in the core network interface device.

It should be appreciated by those skilled in the art that in one or more of the above examples, the functions described in the present disclosure can be implemented in hardware, software, firmware or any combination thereof. When implemented in software, these functions can be stored in a computer-readable medium or transmitted as one or more instructions or codes on the computer-readable medium. Computer-readable medium includes computer storage medium and communication medium, where communication medium includes any medium that facilitates the transfer of computer programs from one place to another. The storage medium can be any available medium that can be accessed by a general purpose or special purpose computer.

The above-mentioned specific embodiments further explain the purpose, technical solutions and beneficial effects of the present disclosure in detail. It should be understood that the above is only a specific embodiment of the present disclosure, and is not used to limit the scope of the present disclosure. Any modifications, equivalent substitutions, improvements, etc. made on the basis of the technical solutions of the present disclosure should fall within the scope of the present disclosure.

It should be understood by those skilled in the art that embodiments of the present disclosure can be provided as methods, systems, or program products. Therefore, an embodiment of the present disclosure may take the form of an entirely hardware embodiment, an entirely software embodiment, or an embodiment combining software and hardware aspects. Furthermore, an embodiment of the present disclosure may take the form of a program product embodied on one or more computer usable storage media (including but not limited to magnetic disk storage, CD-ROM, optical storage, etc.) storing computer usable program codes therein.

Embodiment of the present disclosure are described with reference to flowcharts and/or block diagrams of methods, devices (system), and program products according to embodiments of the present disclosure. It should be understood that each process and/or block in the flowchart and/or block diagram, and combinations of the processes and/or blocks in the flowchart and/or block diagram can be implemented by program instructions. These program instructions may be provided to a processor of a general purpose computer, a special purpose computer, an embedded processor or another programmable data processing device to produce a machine, so that the instructions executed by the processor of the computer or the other programmable data processing device produce means for implementing the functions specified in one or more processes in the flowchart and/or one or more blocks in the block diagram.

These program instructions may also be stored in a computer-readable storage that can direct a computer or another programmable data processing device to operate in a specific manner, so that the instructions stored in the computer-readable storage produce an article of manufacture including instruction means that implement the functions specified in one or more processes in the flowchart and/or one or more blocks in the block diagram.

These program instructions can also be loaded onto a computer or another programmable data processing device, so that a series of operation steps are performed on the computer or another programmable device to produce a computer-implemented process, so that the instructions executed on the computer or another programmable device provide steps for implementing the functions specified in one or more processes in the flowchart and/or one or more blocks in the block diagram.

Obviously, those skilled in the art can make various modifications and variations to the embodiments of the present disclosure without departing from the spirit and scope of the present disclosure. Thus, if these modifications and variations of the embodiments of the present disclosure fall within the scope of the claims of the present disclosure and their equivalents, the present disclosure is also intended to include these modifications and variations.

What is claimed is:

1. An access method, effected by a wireless backhaul node, comprising:

determining an upper-layer parent node of the wireless backhaul node in a wireless backhaul path from a donor base station to the wireless backhaul node, wherein the upper-layer parent node is the donor base station of the wireless backhaul node or is an intermediate wireless backhaul node in the wireless backhaul path; and transmitting first information to the donor base station directly or transmitting the first information to the donor base station via the intermediate wireless backhaul node;

wherein the first information comprises identity information of the wireless backhaul node and/or operating mode information of the wireless backhaul node.

2. The access method according to claim 1, wherein the first information is transmitted to the donor base station directly through one the following messages:

Msg1 of a random access procedure;
a radio resource control (RRC) connection establishment request message;
an RRC connection establishment completion message;
a predefined message dedicated to report of identity characteristics information;
other uplink messages.

3. The access method according to claim 1, wherein the operating mode information of the wireless backhaul node comprises one or a combination of:
   indication information indicating that the wireless backhaul node operates in a Layer 3 mode or Layer 2 mode;
   indication information indicating that the wireless backhaul node is visible or invisible to a predetermined node, wherein the predetermined node comprises a core network node and/or a radio access network (RAN) side node other than the wireless backhaul node;
   indication information indicating that the wireless backhaul node operates in a fifth-generation (5G) cell mode or distributed unit (DU) mode; and
   indication information indicating two operating modes supported by the wireless backhaul node simultaneously.

4. The access method according to claim 3, wherein subsequent to transmitting the first information, the method further comprises:
   if an operating mode of the wireless backhaul node is the Layer 3 mode or is visible to the predetermined node or is the 5G cell mode, initiating, by the wireless backhaul node, an Ng interface setup process and an Xn interface setup process with the donor base station;
   and/or,
   if an operating mode of the wireless backhaul node is the Layer 2 mode or is invisible to the predetermined node or is the DU mode, initiating, by the wireless backhaul node, an F1 interface setup process with the donor base station.

5. The access method according to claim 1, wherein the determining the upper-layer parent node of the wireless backhaul node comprises:
   determining a range of selectable cells based on pre-acquired relevant node information on a node configured to provide a wireless backhaul service, wherein the relevant node information comprises at least one of: a donor base station identifier, donor base station cell list information, a wireless backhaul node identifier, wireless backhaul node cell list information; and
   selecting, based on signal qualities of searched cells, a cell satisfying predefined conditions from the range of selectable cells and accessing the cell, wherein the upper-layer parent node is a donor base station or a wireless backhaul node that the accessed cell belongs to.

6. The access method according to claim 5, wherein the relevant node information further comprises a type of wireless backhaul service supported by a cell, and types of the wireless backhaul service comprise a Layer 2 wireless backhaul service and a Layer 3 wireless backhaul service.

7. The access method according to claim 6, wherein the predefined conditions comprise at least one of following conditions: the cell is configured to provide a wireless backhaul service corresponding to the operating mode of the wireless backhaul node, a quality of a link from the cell to the wireless backhaul node satisfies a predefined requirement, and the cell allows access by a new wireless backhaul node.

8. The access method according to claim 5, wherein prior to determining the wireless backhaul node, the method further comprises:
   transmitting, by the wireless backhaul node, a request message to an operation, administration, and maintenance (OAM) function entity of a core network, and receiving, by the wireless backhaul node, relevant node information on a node configured to provide a wireless backhaul service that is returned from the OAM function entity based on the request message.

9. The access method according to claim 5, wherein the transmitting the first information to the donor base station via the intermediate wireless backhaul node comprises:
   transmitting, by the wireless backhaul node, the first information over a path and bearer already established between the intermediate wireless backhaul node and the donor base station; or
   triggering, by the wireless backhaul node, an establishment of a path and bearer between the intermediate wireless backhaul node and the donor base station and transmitting, by the wireless backhaul node, the first information over the newly established path and bearer.

10. A wireless backhaul node, comprising a transceiver, a storage, a processor and a program stored in the storage and configured to be executed by the processor, wherein
   the processor is configured to read the program from the storage to perform following process: determining an upper-layer parent node of the wireless backhaul node in a wireless backhaul path from a donor base station to the wireless backhaul node, wherein the upper-layer parent node is the donor base station of the wireless backhaul node or is an intermediate wireless backhaul node in the wireless backhaul path;
   the transceiver is configured to transmit first information to the donor base station directly or transmit the first information to the donor base station via the intermediate wireless backhaul node;
   wherein the first information comprises identity information of the wireless backhaul node and/or operating mode information of the wireless backhaul node.

11. The wireless backhaul node according to claim 10, wherein
   the transceiver is further configured to transmit the first information to the donor base station directly through one of following messages:
   Msg1 of a random access procedure;
   a radio resource control (RRC) connection establishment request message;
   an RRC connection establishment completion message;
   a predefined message dedicated to report of identity characteristics information;
   other uplink messages.

12. The wireless backhaul node according to claim 10, wherein the operating mode information of the wireless backhaul node comprises one or a combination of:
   indication information indicating that the wireless backhaul node operates in a Layer 3 mode or Layer 2 mode;
   indication information indicating that the wireless backhaul node is visible or invisible to a predetermined node, wherein the predetermined node comprises a core network node and/or a radio access network (RAN) side node other than the wireless backhaul node;
   indication information indicating that the wireless backhaul node operates in a fifth-generation (5G) cell mode or distributed unit (DU) mode; and indication information indicating two operating modes supported by the wireless backhaul node simultaneously.

13. A non-transitory computer readable storage medium storing therein a computer program, wherein the computer program is configured to be executed by a processor to implement operations of the access method according to claim 1.

* * * * *